Oct. 25, 1932.  M. STANDISH  1,884,334

REAR GATE STRUCTURE

Original Filed Aug. 20, 1928

INVENTOR
Myles Standish
BY Arthur C. Brown
ATTORNEY

Patented Oct. 25, 1932

1,884,334

UNITED STATES PATENT OFFICE

MYLES STANDISH, OF OMAHA, NEBRASKA

REAR GATE STRUCTURE

Original application filed August 20, 1928, Serial No. 300,725. Divided and this application filed April 28, 1930. Serial No. 447,895.

My invention relates to truck bodies and more particularly to rear gate structure of truck bodies, the principal objects of the invention being to increase the utility of a rear gate structure, to adapt rear gate elements for a plurality of purposes, to facilitate the operation of diversified rear gate elements and to enhance the strength of means supporting the several elements, this application being a division from my co-pending application, Serial No. 300,725, in which the novel features of the structure are described.

In accomplishing these and other objects of the invention, I have provided improved details of structure, the preferred forms of which are illustrated in the accompanying drawing, wherein.

Figure 1:
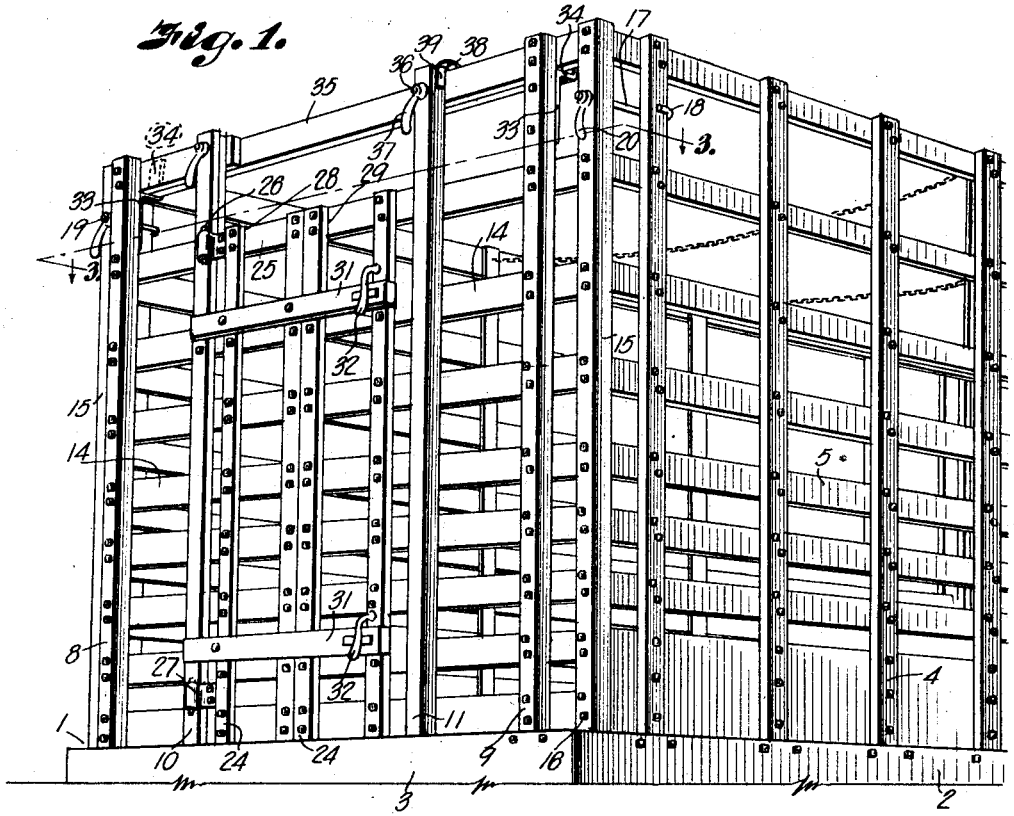
Fig. 1 is a perspective view of the rear end portion of a truck body including my improved rear gate structure.
Figure 2:
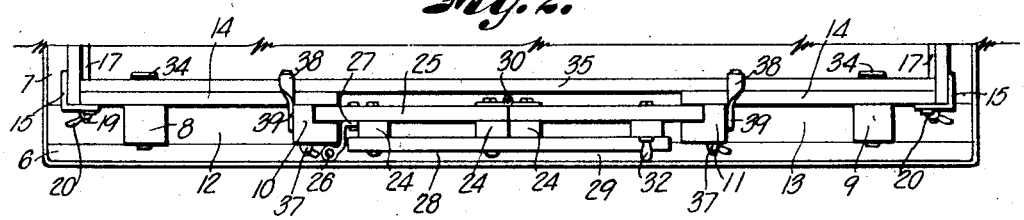
Fig. 2 is a plan view of the rear gate structure including adjacent portions of the body.
Figure 3:
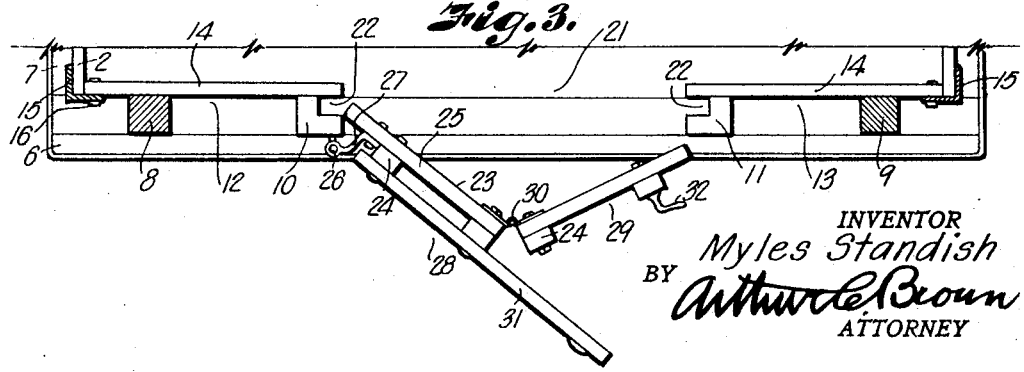
Fig. 3 is a similar view illustrating one of the gate elements in partly opened position.

Referring in detail to the drawing:

1 designates generally a truck body comprising longitudinal supporting frame members 2, a rear transverse element 3 and side stakes 4 mounted on the longitudinal members and connected by horizontal bars 5 to form side sections. Rear ends of the bars 5 extend beyond the rearmost side stakes 4 for a purpose presently disclosed.

The rear transverse element 3 preferably comprises a pair of joists 6 and 7 adapted to receive end stakes 8 and 9 and intermediate stakes 10 and 11, the joists for example being spaced and plugs or spacers being inserted to provide sockets to receive the stakes.

The rear gate structure includes a pair of similar sections 12 and 13, each comprising a pair of end and intermediate vertical stakes connected by horizontal bars 14 extending outwardly beyond the end stakes 8 and 9. Vertical angle bars 15 are secured by bolts 16 to the protruding ends of the bars 14 and are adapted to engage the outer faces of the rearwardly projecting ends of the side member bars 5. Hook-bolts 17 extending through the angle flanges are provided with hooks 18 for engaging rearmost stakes 4 of the side members and with threaded ends 19 on which wing nuts 20 may be mounted for securing the gate sections to adjacent side sections.

The gate sections 12 and 13 are spaced laterally to afford a door opening 21. The intermediate stakes 10 and 11 are provided with vertical grooves 22 for slidably receiving the edges of a gate member 23 adapted to close the opening, and comprising vertical bars 24 and longitudinal bars 25 projecting beyond the vertical bars for engaging in said grooves.

Mounted on one of the retaining end gate stakes for example 10, are pin hinge members 26 for receiving hinges 27 fixed to selected bars 25 of the gate member 23 so that the gate member may be moved vertically in the grooves of the stakes 10 and 11 for mounting the hinges on the pins or removing the gate.

The gate member 23 further preferably comprises halves or leaves 28 and 29 connected by hinges 30 and adapted to break outwardly. Reinforcing bars 31 are secured to the outer faces of the vertical bars of the gate leaf 28, and have outer ends extending across the opposite leaf 29, and the opposite leaf is provided with pivotal hooks or latches 32 mounted in selected vertical gate bars in suitable position for being moved into engagement with the projecting ends of the reinforcing bars to retain the leaves of the gate in extended and closed position.

Brackets 33 are erected on the inner faces of selected stakes of the rear end gate structure, preferably the exterior stakes 8 and 9, and have inwardly or forwardly projecting retaining angles 34 to receive a beam 35 adapted to extend across the rear end of the truck body for reinforcing the rear gate structure. The beam is held in engagement with the sections 12 and 13 by bolts 36 extending through the stakes 10 and 11 and through the beam to receive wing nuts 37. Strap-like retaining ears 38 fixed to the beam are provided with ear-like bent ends 39 engageable with selected stakes such as 10 and 11 to anchor the beam to the end gate structure.

In operating apparatus including a body equipped with end gate structure such as described, the gate member 23 may be unlatched by releasing the latching hooks 32 to permit the leaves to hinge centrally on their hinges 30 so that the member 23 may be pivoted on its hinges 27 for swinging the same away from the opening 21.

A relatively small opening is thus afforded for loading small animals, the gate member 23 being easily operated and may be quickly closed and latched.

The entire gate member 23 may be lifted from its hinges and moved slidably vertically out of the grooves of the posts 10 and 11.

Attention is called to the fact that the beam 35 serves to reinforce the sections 12 and 13 when the opening 21 is made accessible by removal or outward swinging of the gate member 23.

The beam may be removed easily upon removal of the bolts for enlarging the opening 21 vertically. The entire end gate may be removed by removing the wing nuts on the bolts 17 and releasing the hooks from the side members, thus permitting the lift of the end gate stakes from the transverse joists.

It is apparent that the entire end structure may be removed bodily when the gate member 23 is securely attached to and latched to the side sections, and that either of the sections 12 and 13 may be separately removed, for example as the gate member 23 has been lifted from its grooves and the cross beam 35 lifted from its supporting brackets.

An end gate structure such as described, is particularly useful when a truck is to be employed in a variety of services and will be relatively rigidly supported by the body frame and engaged with the side members of the body to provide a stable structure while the several elements may be quickly and easily separated due to the relatively small number of attaching means employed in the assembly.

What I claim and desire to secure by Letters Patent is:

1. In a truck body having side boards, an end gate structure including stakes adjacent the side boards, gate-supporting stakes spaced from said first named stakes, means connecting the first named stakes and the side boards to the respective gate-supporting stakes, a gate supported by said gate stakes, bracket members secured to the upper ends of the first named stakes forming upwardly opening seats, a removable top bar seated in said seats and extending across said stakes to retain the stakes in alignment between the side boards, and means on said top bar engaging side faces of said gate-supporting stakes to prevent outward movement of the side boards.

2. In a truck body having side boards, an end gate structure including stakes adjacent the side boards, gate-supporting stakes spaced from said first named stakes, means connecting the first named stakes and the side boards to the respective gate-supporting stakes, a gate supported by said gate stakes, bracket members secured to the upper ends of the first named stakes forming upwardly opening seats, a removable top bar seated in said seats and extending across said stakes to retain the stakes in alignment between the side boards, and strap members on the top bar and having ears engaging against sides of the gate-supporting stakes to prevent outward movement of the side boards.

In testimony whereof I affix my signature.

MYLES STANDISH.